Jan. 31, 1956      T. M. McKEE      2,733,355
THERMAL NEUTRON MEASURING
Filed Feb. 19, 1952
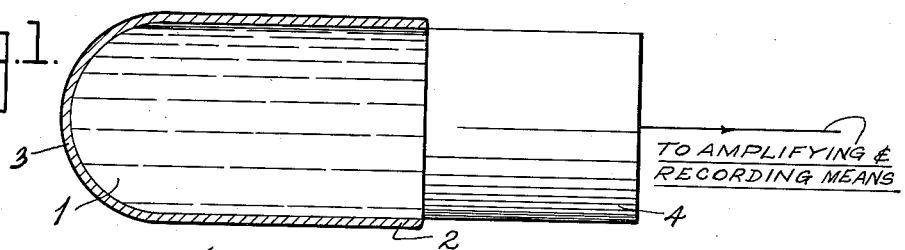
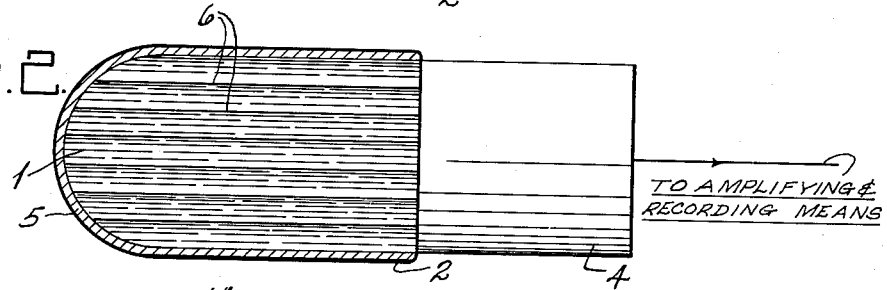
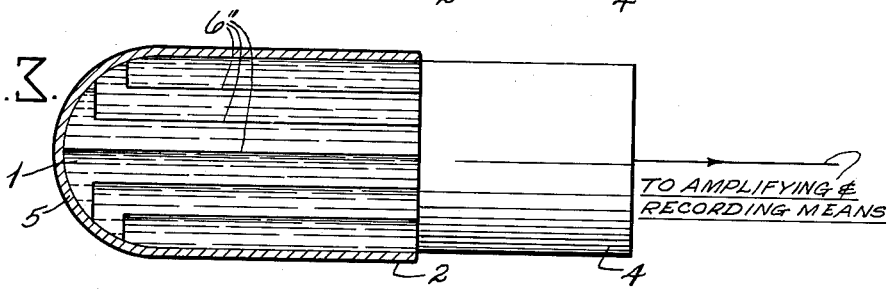
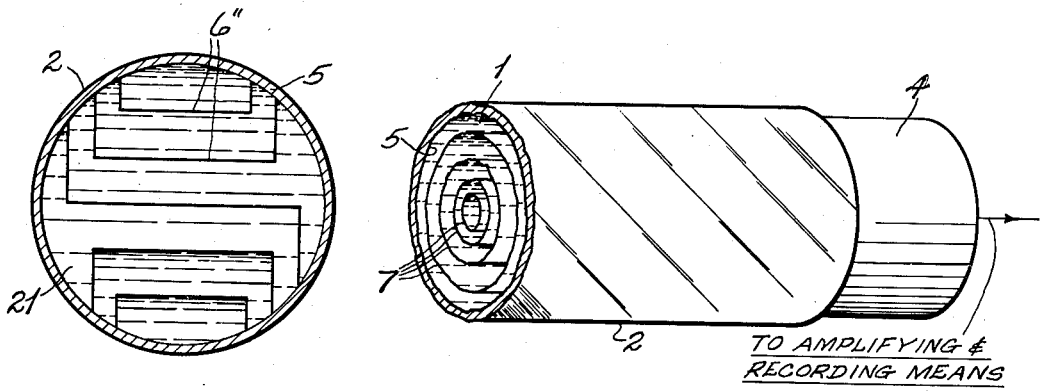
INVENTOR.
THERESA M. McKEE
BY
ATTORNEY

United States Patent Office 2,733,355
Patented Jan. 31, 1956

2,733,355

THERMAL NEUTRON MEASURING

Theresa M. McKee, New York, N. Y., assignor to Texaco Development Corporation, New York, N. Y., a corporation of Delaware Application February 19, 1952, Serial No. 272,477

8 Claims. (Cl. 250—71)

This invention relates to the detection and measurement of neutrons, and more particularly to a luminophor element for such purposes.

Certain substances such as anthracene, zinc sulfide, and calcium tungstate have been found to possess the property of converting radiation such as beta rays, gamma rays, and alpha particles, into radiation in other ranges of the spectrum, for example, into ultraviolet or visible light range. Such substances are called luminophors and their utilization in the detection of such radiation has been practiced to some extent. In the simpler arrangements, the luminophor is subjected to radiation, and the converted radiation radiated from the luminophor is detected and measured in a photoelectric means such as a photomultiplier tube.

Such an arrangement is suitable for the detection and measurement of penetrative radiation such as gamma rays, beta rays, or alpha particles, and, in the case of the inorganic phosphors, fast neutrons. At the present time no luminophor, whether organic or inorganic, alone efficiently detects thermal neutrons. In order to detect thermal neutrons the presence of another substance is required in conjunction with the luminophor. Such a substance is one which reacts with neutrons to emit non-visible secondary radiation. This secondary radiation, and not the neutrons, reacts with the luminophor and is converted into radiation which is capable of being detected and measured by photoelectric means.

My invention comprises the use of indium in combination with a luminophor which reacts with the radiation emitted by the indium when it is struck by neutrons. Preferably, the indium is used in the form of foils arranged within a liquid luminophor.

Other substances, such as boron, lithium, cadmium, and compounds thereof have been used in conjunction with luminophors for the detection of thermal neutrons. These substances are generally used in the form of a coating which surrounds the luminophor, or as a dispersion within the luminophor.

The use of such arrangements has been limited in many particulars. For instance, the use of such substances as a coating which surrounds the luminophor leads to the inefficient emission of radiation by the substance in such a manner that a substantial portion of the emitted radiation does not reach the luminophor. Also, it is often difficult to prepare uniform coatings or dispersions of these substances. A further limitation resides in the fact that the presence of some of these substances within a luminophor hinders the transmission of the radiation emitted by the luminophor to the photoelectric means used to detect and measure it.

Indium, which has a cross section of approximately 500 barns for neutrons having energies from 0.01 to 1 electron volts and the high cross section of 10,000 barns for neutrons having energies from 1 to 2 electron volts, is among the elements particularly suited for the detection of thermal neutrons. It has the further advantage of being available in foil form, a form which is easily and conveniently handled.

An advantage of the present invention is the provision of a luminophor element which efficiently detects and measures neutrons and is easily and simply constructed.

Another advantage of the invention is the provision of a luminophor element containing a known quantity of a substance used to convert neutron radiation into a radiation which will react with the luminophor causing it in turn to emit radiation. Furthermore, the neutron-reactive substance can be placed within or without the luminophor in known and useful arrangements.

A further advantage of the invention consists of the provision of a neutron-reactive substance, for use in conjunction with a luminophor in the detection and measurement of neutrons, which does not interfere substantially with the transmission of radiation emitted by the luminophor.

These and other advantages of the invention will be explained in the following description and claims taken in conjunction with the attached drawings wherein:

Figure 1 illustrates diagrammatically the novel detector of neutrons wherein the indium is used as an envelope surrounding the luminophor.

Figure 2 illustrates the novel detector of neutrons wherein a plurality of indium foils are used within the luminophor.

Figures 3, 4 and 5 illustrate other modifications of the invention.

Referring to Figure 1, the numeral 1 refers to a liquid luminophor such as terphenyl in xylene confined within a substantially cylindrical shell or container 2, the shell being constructed from glass or quartz, for example. Within the shell 2 and surrounding all but a portion of the liquid body is an envelope of indium foil 3 which may range in thickness from 50 mg. per square cm. to 150 mg. per square cm., but is preferably 100 mg. per square cm.

The open section of the envelope is adjacent to the input section of a photomultiplier tube 4, the output of which feeds into an electrical circuit means, not illustrated, for amplifying and indicating the output of the photomultiplier tube.

While the foil 3 may be placed on the exterior of the shell 2, it is preferred that it be placed on the inner surface as illustrated, since the shell will afford substantial protection of the foil against physical damage.

In Figure 2 an arrangement of a plurality of indium metal laminae 6' is depicted. As shown here the laminae are disposed within the luminophor in such a manner as to be parallel to one another while at the same time being perpendicular to that part of the photomultiplier tube 4 which receives the radiation emitted by the luminophor. Any convenient means may be used to attach the laminae to the wall of the container. For example, a light-transparent plastic such as Lucite may be used to bond the laminae to the container wall and to the photomultiplier tube. When the indium is used in the form of a plurality of laminae within the luminophor it is convenient to surround the luminophor, or if a liquid, its container, with a material which reflects light. For this purpose, a coating of aluminum or magnesium oxide may be used. Such a reflector is denoted in Figures 2, 3, 4, and 5 by the numeral 5.

Figures 3 and 4 illustrate another arrangement of the invention wherein a plurality of indium laminae 6'' is employed. This arrangement is substantially similar to that illustrated in Figure 2 in all respects but one. The difference resides in the disposal of the laminae at the end of the luminophor which is opposite to the photomultiplier tube. All the laminae, except one which lies along the long axis of the luminophor, are bent at 90° angles so as to be in a stepwise relationship with one another. It is to be understood that although the angles of bending are shown as 90° any bend between 0° and 180° may be used. Figure 3 is a view of this arrangement where the long axis of the luminophor lies in the page, while Figure 4 represents a cross-section of the arrangement wherein the long axis of the luminophor is perpendicular to the page.

Figure 5 illustrates a section of the novel luminophor element wherein a plurality of indium laminae 7 are arranged as a series of concentric tubes within the luminophor 1.

Arrangement of the laminae as parallel to one another and perpendicular to that part of the photomultiplier tube which receives radiation from the luminophor utilizes the reflecting properties of indium foil for radiation such as light. With such a parallel arrangement, light is reflected from one lamina surface to the adjacent lamina surface and travels up and down the length of the optical path defined by the two laminae. Thus, light is conducted more efficiently to the photomultiplier tube with lessened scattering and loss within the luminophor.

An occasional neutron may find its way between the parallel laminae without striking them. However, the arrangement of the laminae as shown in Figures 3 and 4 will prevent such an occurrence from happening since it will be impossible for a neutron to enter the luminophor without striking an indium lamina. The laminae are shown bent in a stepwise fashion in order to preserve the optical paths between them.

Although the use of indium as laminae is preferred, it is to be understood that other forms and arrangements of indium may be used. For example, the indium may be a combination with other elements in the form of salts, etc. Also, if indium metal is used, it may be employed in other arrangements than those described hereinabove, for example, in the form of a honeycomb, concentric hemispheres, etc.

Stated simply, the phenomena which occur in order that a neutron may be detected by the apparatus of the invention consist in a neutron striking the indium. The indium reacts with the neutron resulting in the emission of secondary radiation which may be alpha particles or gamma rays. The secondary radiation then strikes the luminophor and reacts with it resulting in the emission of secondary radiation by the luminophor. The radiation emitted by the luminophor is usually of shorter wave length than that with which it reacted. For the purposes of the detection of radiation, and in the case of the invention, luminophors, such as naphthalene, terphenyl, and anthracene, in the solid state or dissolved in a solvent such as xylene, or zinc sulfide, which emit visible or ultraviolet radiation are chosen in order that the emitted radiation can be detected by a photomultiplier tube. Finally, the radiation emitted by the luminophor upon excitation by the radiation emitted from the indium as a result of its interaction with a neutron is detected by a photomultiplier tube in conjunction with suitable amplifying and registering means.

Obviously many modifications and variations of the invention hereinabove set forth may be made without departing from the spirit and scope thereof and only such limitations should be imposed as are indicated in the appended claims.

I claim:

1. A scintillator for the detection of pentrative radiation comprising at least one membranous foil of a material having a large capture cross section for neutrons for converting them into other penetrative radiation and quantities of a transparent luminescent material disposed on both sides of the foil for translating said last mentioned radiation into light.

2. A scintillator as in claim 1 in which said material has said large capture cross section for low energy neutrons.

3. A scintillator as in claim 1 in which said first mentioned material comprises indium.

4. A scintillator as in claim 1 wherein said foil has smooth, highly-light-reflective surfaces.

5. A scintillator as in claim 1 in which said foil and said quantities of luminescent material constitute a unitary detector head having a light-output side from which internally produced luminescence may escape to an external light receiving device and at least a major portion of said foil is disposed within said head in substantial alignment with principal mean directions of transmission of said internally produced light toward said side and device.

6. A scintillator as in claim 1 comprising a plurality of said membranous foils in spaced-apart relationship to each other and quantities of said luminescent material disposed on both sides of each foil.

7. A scintillator as in claim 6 in which said foils are in substantially parallel relationship to each other.

8. A scintillator as in claim 1 in which said luminescent material is a liquid.

References Cited in the file of this patent

UNITED STATES PATENTS

| | | |
|---|---|---|
| 2,188,115 | Kallmann et al. | Jan. 23, 1940 |
| 2,206,634 | Fermi et al. | July 2, 1940 |
| 2,279,023 | Kallmann | Apr. 7, 1942 |
| 2,288,718 | Kallmann et al. | July 7, 1942 |

OTHER REFERENCES

"A Scintillation Counter for Therman Neutrons," Draper. Rev. of Sci. Inst., July 1951, volume 22, #7, page 543.

"Fluorescent Liquids for Scintillation Counters,"— Kallmann et al. Nucleonics, March 1951, pages 32–39.

"The Design of Neutron Counters Using Multiple Detecting Layers,"—Lowde. Rev. of Sci. Inst., volume 21, #10, October 1950, pages 835–841.